United States Patent
Sandorfi

[11] Patent Number: 5,831,985
[45] Date of Patent: Nov. 3, 1998

[54] METHOD AND APPARATUS FOR CONTROLLING CONCURRENT DATA TRANSMISSION FROM MULTIPLE SOURCES IN A CHANNEL COMMUNICATION SYSTEM

[75] Inventor: Miklos A. Sandorfi, Foxboro, Mass.

[73] Assignee: EMC Corporation, Hopkinton, Mass.

[21] Appl. No.: 906,064

[22] Filed: Aug. 5, 1997

Related U.S. Application Data

[63] Continuation of Ser. No. 556,162, Nov. 9, 1995, abandoned.

[51] Int. Cl.$^6$ .................................. H04J 3/16; H04J 3/22
[52] U.S. Cl. ............................................. 370/468
[58] Field of Search .................................... 370/465, 464, 370/468, 414, 413, 412, 416, 229, 230, 231, 232, 235

[56] References Cited

U.S. PATENT DOCUMENTS

| | | | |
|---|---|---|---|
| 4,445,116 | 4/1984 | Grow | 340/825.05 |
| 4,942,553 | 7/1990 | Dalrymple et al. | 364/900 |
| 4,953,081 | 8/1990 | Feal et al. | 364/200 |
| 4,964,034 | 10/1990 | Jaskowiak | 364/200 |
| 4,979,099 | 12/1990 | Milia | 364/200 |
| 4,980,886 | 12/1990 | Bernstein | 370/468 |
| 5,132,966 | 7/1992 | Hayano et al. | 370/88.6 |
| 5,151,994 | 9/1992 | Wille et al. | 395/800 |
| 5,231,633 | 7/1993 | Hluchy et al. | 370/94.1 |
| 5,239,651 | 8/1993 | Sodos | 395/725 |
| 5,263,163 | 11/1993 | Holt et al. | 395/725 |
| 5,265,212 | 11/1993 | Bruce, II | 395/325 |
| 5,301,283 | 4/1994 | Thacker et al. | 395/325 |
| 5,367,679 | 11/1994 | Khaira | 395/650 |
| 5,388,097 | 2/1995 | Baugher et al. | 370/85.5 |
| 5,388,228 | 2/1995 | Heath et al. | 395/325 |
| 5,392,434 | 2/1995 | Bryant et al. | 395/725 |
| 5,432,824 | 7/1995 | Zheng et al. | 370/60.1 |
| 5,515,359 | 5/1996 | Zheng | 370/60.1 |
| 5,519,695 | 5/1996 | Purohit et al. | 370/58.2 |

*Primary Examiner*—Ajit Patel
*Attorney, Agent, or Firm*—Fish & Richardson P.C.

[57] ABSTRACT

A method and apparatus for communicating multiple threads, concurrently on a single channel, features a process for prioritizing and limiting the transmission time allocated to any particular host. The invention features providing a channel switch capable of communicating with a plurality of client sources, the sources being connected for transmitting frames of data to the channel, and to at least one storage device connected to the channel. The information transmission is formatted and controlled at the switch in accordance with a frame protocol and the protocol provides a predetermined method for selecting which information host to connect to which channel and for how long. The switch allocates connection line capacity to the sources according to a selected priority and the credit or buffer available to the source. Accordingly, an average priority waiting is associated with each information source.

10 Claims, 5 Drawing Sheets

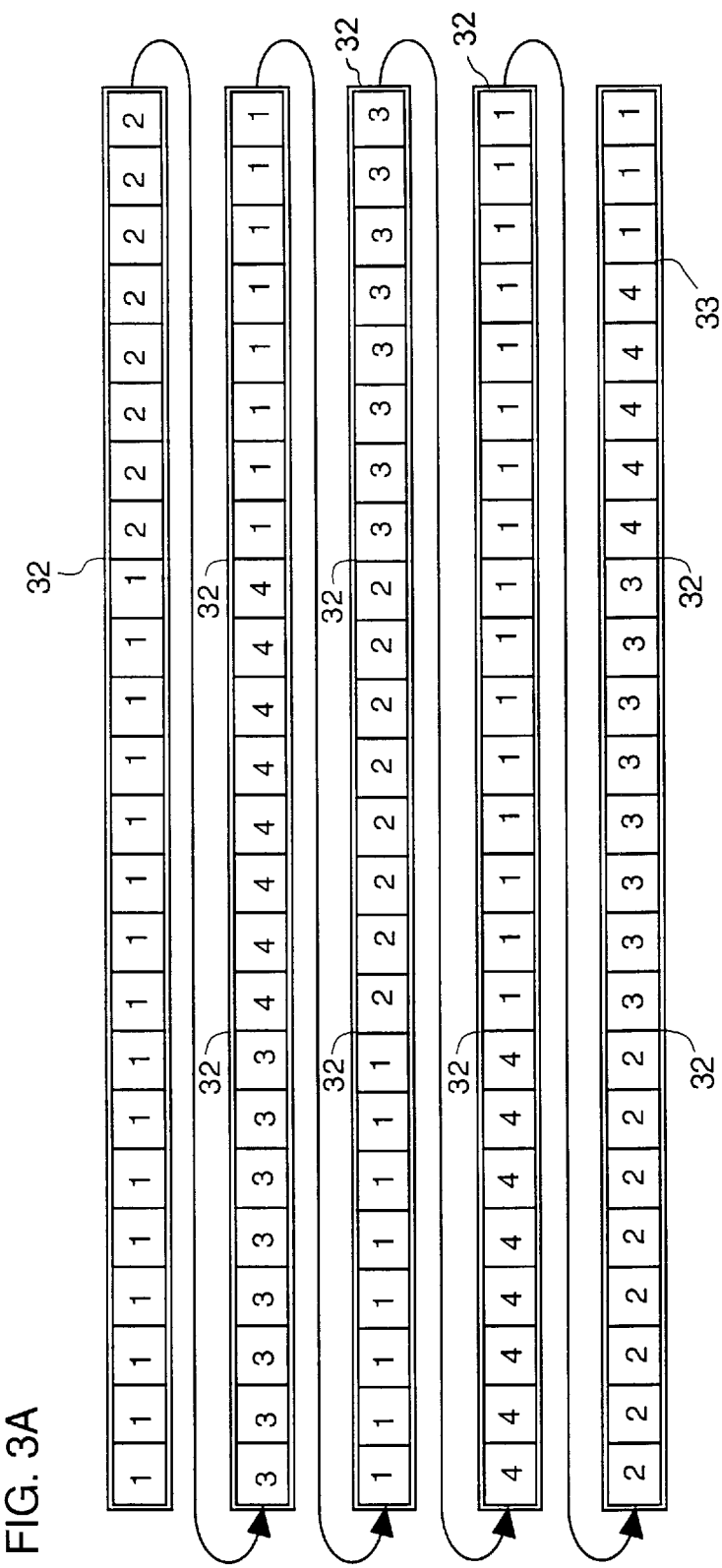

METHOD AND APPARATUS FOR CONTROLLING CONCURRENT DATA TRANSMISSION FROM MULTIPLE SOURCES IN A CHANNEL COMMUNICATION SYSTEM

This is a continuation of application Ser. No. 08/556,162, filed Nov. 9, 1995, now abandoned.

The invention relates generally to data communications systems, and in particular, to a method and apparatus for controlling the concurrent use of multiple communication threads on a single channel.

The fibre channel standard is an example of one of several communications protocols which allow multiple communications threads to exist in a single channel. This is especially useful when a channel switch, called the "fabric" in connection with a fibre channel, is employed. When connected to a fabric switch, multiple port connections can communicate with a single device such as a disk storage subsystem. Thus, multiple hosts or clients can be connected to the fabric switch, all wanting and able to access the storage subsystem. This necessitates some method of allocating bandwidth among the hosts, that is, providing bandwidth sharing in some organized and "fair" manner, between the multiple ongoing communications threads. Referring in particular, to the fibre channel protocol, the fibre channel allows the communication of data between ports and communication channels in units called "frames". Multiple frames form a sequence and multiple sequences form an exchange. A SCSI transaction, including the command, transfer ready, data, and the response is an example of an exchange. A sequence then carries out each phase of the SCSI command.

For purposes of illustration, assume there are four computers, or clients, connected through a fibre channel fabric switch to a single disk storage subsystem. This is illustrated in FIG. 1. Assume further that all four clients request to access information on the storage subsystem. This implies that there will be four active, concurrent, communications threads on which the data transfer will occur. If a limit of 48 kilobytes is imposed upon the data length in any given sequence, then if more than 48 kilobytes is to be transferred from any one client, multiple sequences are required to transmit all of the read data. Unless there is some method for sharing the bandwidth, a data stream for one of the host systems could monopolize the communications channel, increasing the latency of response to each other client.

Alternatively, systems have been created wherein the fabric switch transfers data in a round robin fashion between the clients. In this relationship, now referring to FIG. 2, at the end of each sequence, the fabric switch steps to a next client and handles its sequence of data. Thus the data interleaves at the sequence boundaries as illustrated in FIG. 2. In this method of operation, there is not a lot of granularity as data is interleaved at the sequence boundaries. Moreover, during transmission of a sequence, if a client port runs out of buffer space (the amount of available buffer space being designated "credit" in the fibre channel), the transmission will stall until the port regains enough buffer space so that it may continue receiving or transmitting data. This also increases the latency of response to other pending sequences from other clients wishing to access and communicate across the same fabric switch.

Accordingly, therefore, a new method and apparatus are provided to increase the throughput of a shared communication channel, to provide reduced latency among frames, and to take advantage of and to prioritize the transmission of data to and/or from different clients according to an accepted priority system.

SUMMARY OF THE INVENTION

The invention relates to a method and apparatus for communicating multiple threads concurrently on a single channel. The apparatus features a channel switch capable of communicating with plural information client sources, a plurality of such information sources connected to the channel switch for transmitting frames of data, at least one storage or other peripheral device connected by a data channel to the channel switch, and the channel switch receiving and transmitting information according to a frame protocol, the protocol providing a predetermined method for selecting which information source to connect to the channel, and hence to the peripheral device, and for allocating the connection line capacity associated with each source according to a selected priority number of frames of data.

The apparatus further features a fibre channel switch which limits the selected number of frames allocated to each source depending upon a priority value assigned to the source and the credit available to the source. In another aspect of the invention, the apparatus features a system for determining a current credit available to each information source, thus providing average priority weighing to each information source according to the assigned priority values.

The method of the invention relates to the steps of communicating files of data, through a channel switch, between a plurality of client information sources and a storage subsystem or other peripheral device having at least one mass storage device and connected to the channel switch over a single data channel. The method features the steps of determining the credit available to each of the information sources, determining a priority value, expressed as a number of frames, dedicated to each of the information sources, and communicating with the connected client information sources in a round robin protocol taking into account the credit and priority associated with each information source.

In a particular aspect of the invention, the method features the steps of limiting each transmission of data to or from a client source to a number of frames which is the lesser of a number based on the frame priority value and a number based on the client source credit. In a particular aspect of the invention, the channel is a fibre channel operating according to a fibre channel standard in which frames of data are organized into sequences, and the credit represents a buffer capacity available to a source along the transmission path. The method, by affecting the number of frames transmitted from each source, effectively provides a bandwidth priority averaging in accordance with the invention.

BRIEF DESCRIPTION OF THE DRAWING

Other objects, features, and advantages of the invention will be apparent from the following description taken together with the drawings in which:

FIG. 3A is an illustration of a data stream received by or leaving a channel switch as in FIG. 3 wherein a data stream is terminated for lack of credit.

DESCRIPTION OF THE PREFERRED EMBODIMENT

Figure 1:
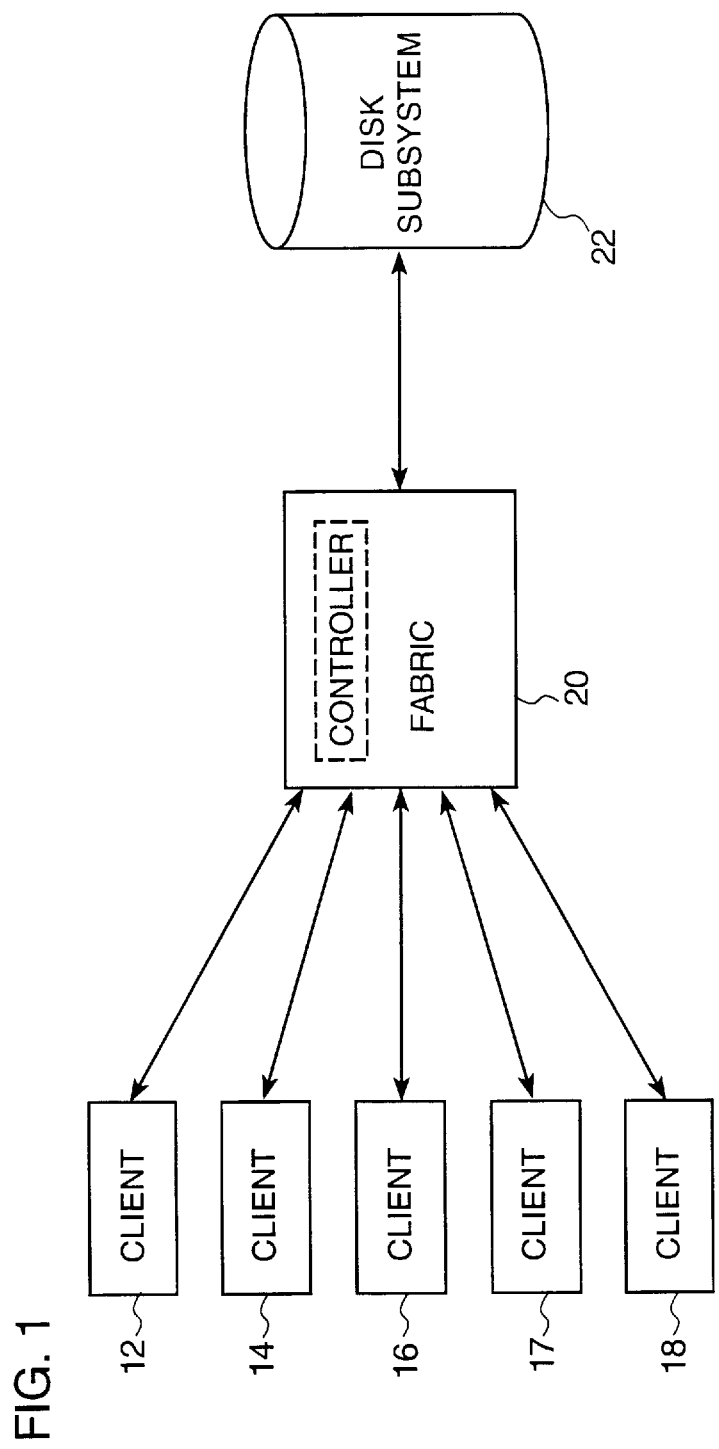
FIG. 1 is a diagram illustrating a fibre channel system interconnecting plural workstation information source clients to a single disk subsystem.

The invention is directed and applicable to communications channels generally, and in this particular embodiment to a channel operating under the fibre channel protocol. Referring to FIG. 1, a fibre channel system includes a plurality of client information sources 12, 14, 16, 17, and 18, connected, in the illustrated embodiment of the invention, to a fibre channel switch or bridge bridge, often called a fabric 20. The fibre channel switch is connected, in the illustrated embodiment, to a single disk subsystem 22 although other applications or single element channels could be substituted for the disk subsystem. In other embodiments of the invention, relating to other communications protocols which, like the fibre channel protocol, allow multiple communications threads to exist concurrently on a single channel, other embodiments of the fabric switch would be employed. The description in this embodiment will, however, be directed, for clarity, to the fibre channel protocol.

Figure 2:
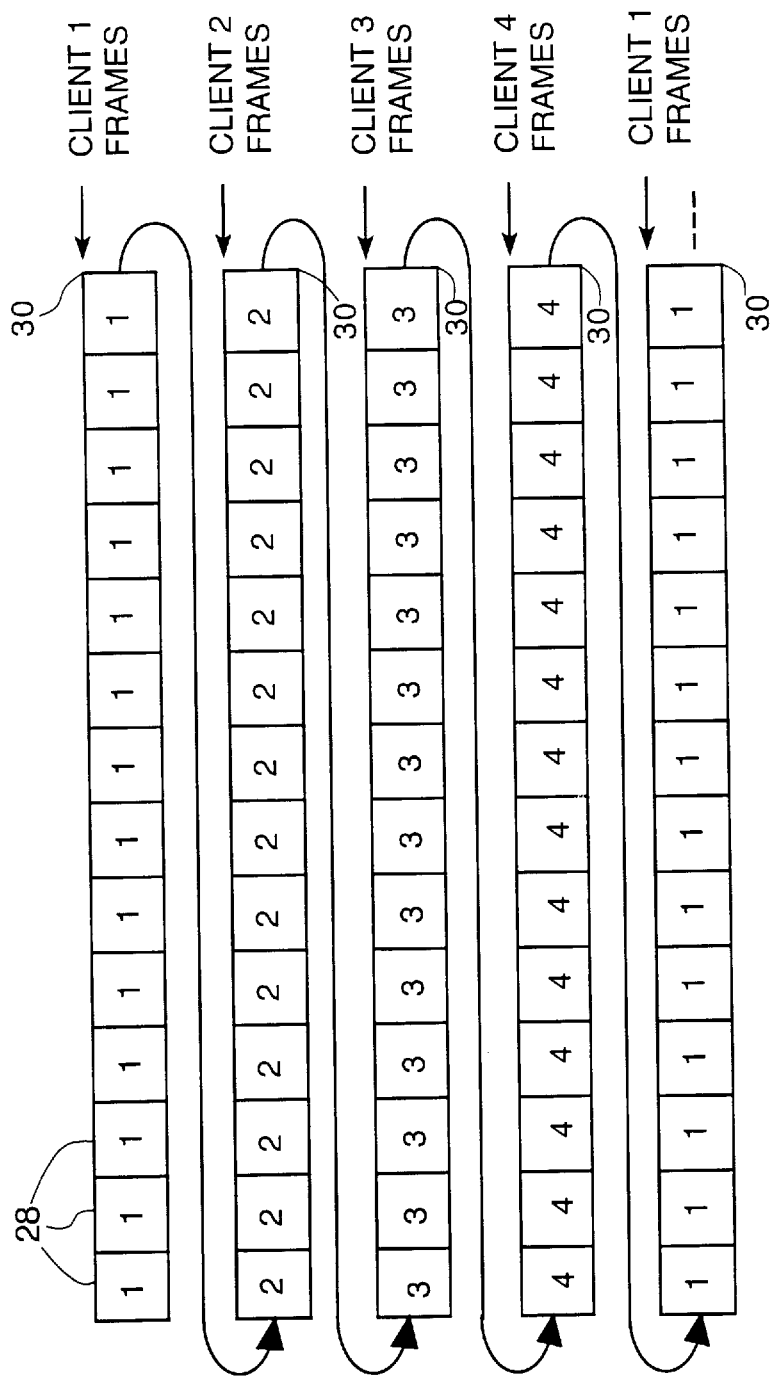
FIG. 2 is an illustration of a data stream received by or leaving a channel switch when interleaving between various clients at the sequence boundary level.

As described above, if four of the information client sources desire to communicate a data stream, having frames 28 of data, with the disk subsystem at the same time, a typical prior art fabric switch 20 would provide switching at the data stream sequence boundaries 30 and would provide access between the clients and the disk subsystem in a round robin fashion as illustrated in FIG. 2 wherein each square represents one frame of data, the number within the square identifies the client source, and a sequence is made up, in this embodiment, of fourteen frames. In that situation, it can occur that one or more of the clients has little buffering capacity associated with its communication facility through the fabric or the subsystem circuitry; and accordingly, the client port may run out of so-called credit (as used in the fibre channel protocol) or buffering. In that circumstance, transmission will stall since the client can not send or receive any further data and the end of the sequence has not yet occurred. Thus, when the port regains some credit it may continue to receive or transmit data; however, the delay, in other words the latency, will be increased for each of the other pending sequences.

Figure 3:
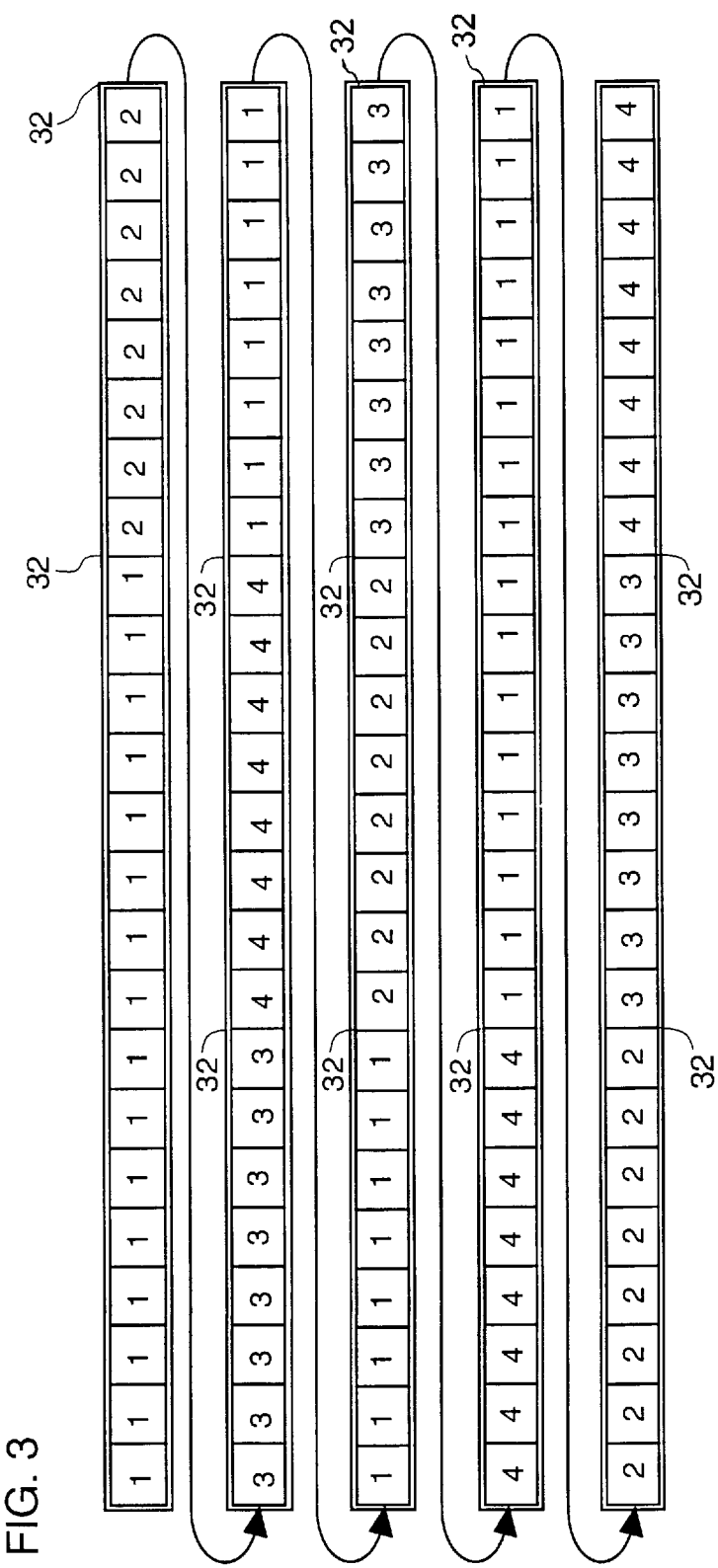
FIG. 3 is an illustration of a data stream received by or leaving a channel switch when interleaving between clients is in accordance with the preferred embodiment of the invention.

Referring to FIG. 3, in accordance with the invention, instead of interleaving data on a sequence boundary as illustrated in FIG. 2, the invention provides a method of interleaving data from different threads on frame boundaries 32 while employing intelligent methods to prevent link stalling in the case that there is insufficient or no available credit. In FIG. 3, as in FIG. 2, each square represents a frame of data, and the number within the square identifies the client source.

Figure 4:
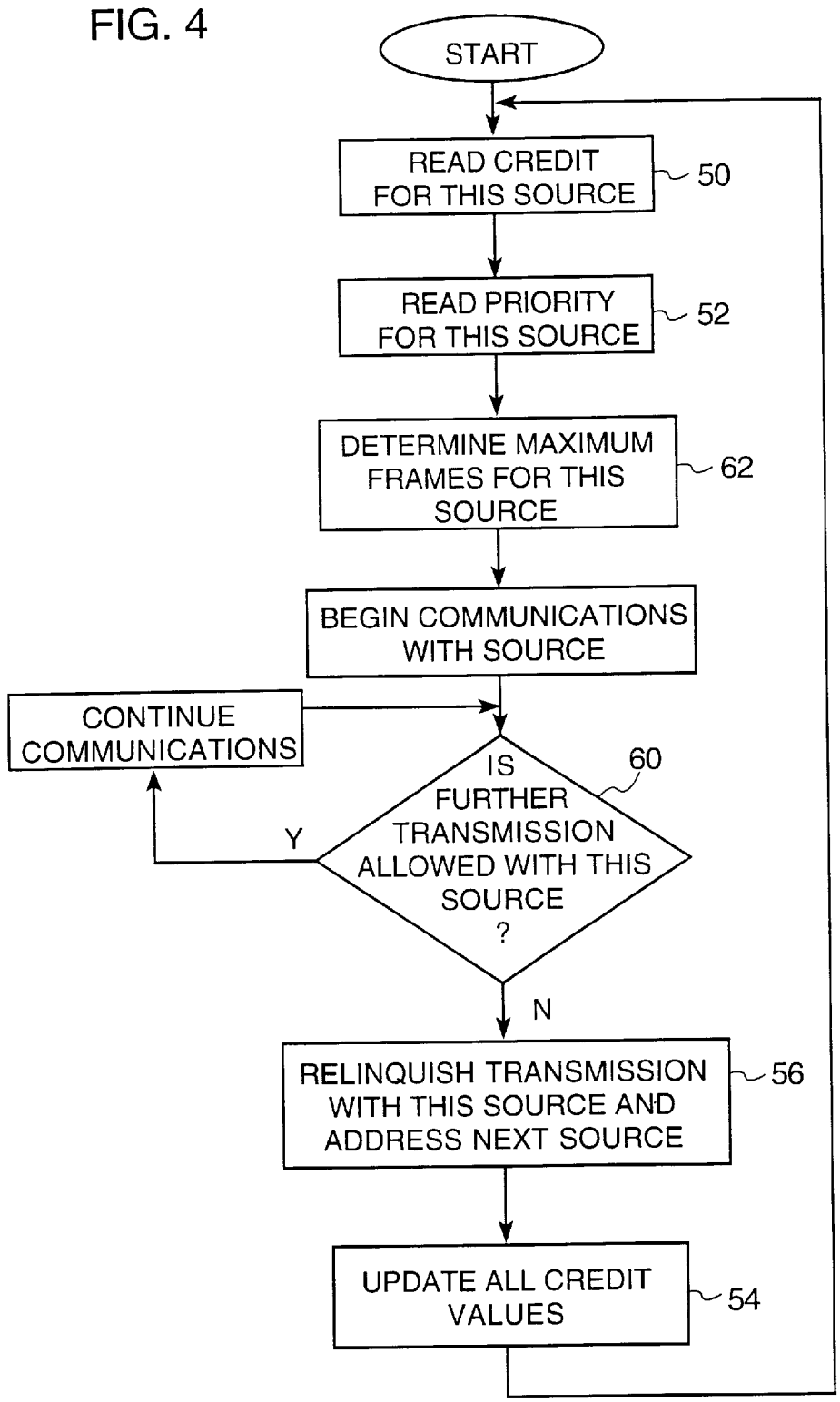
FIG. 4 is a flow chart illustrating the operation of the invention for enabling the data stream of FIG. 3 to be constructed and processed.

Referring to FIG. 4, to implement this bandwidth sharing/fairness method, the fibre channel hardware is programmed to include a new parameter based upon connection criteria information for each sequence. The hardware receives at 52 from the system the priority value for each source, given as the maximum number of frames which it can send in a given sequence before being required to relinquish control of the transmit/receive pipe and passing that control on to the next pending transmit sequence. The hardware also has knowledge (at 50) of the available credit for each port. This value is updated on an ongoing basis (at 54). The hardware continually tracks the number of transferred frames, at 60, and if the client port will run out of credit and all frames have not yet been received (determined at 62), the hardware, in accordance with the illustrated embodiment of the invention, will relinquish transmission (at 56) of the current sequence and transfer control to another sequence. This is performed by the controller situated at fabric switch 20 as illustrated in FIG. 1.

All active sequences are thus dealt with by the hardware in a round robin queue. Optionally, in accordance with the invention, the hardware can be programmed to "control" or "hog" a link and send an entire sequence (or sequences) without giving up the channel. This is comparable to providing (and can be accomplished by providing) a very high priority to the sequence. In the ordinary course, however, a range of priorities will be assigned to all sequences which will allow, in general, a larger number of transmitted frames for the higher priority sequences and, accordingly, a lower number of transmitted frames for low priority sequences. Therefore, over a period of time, higher priority sequences will receive more of the transmit bandwidth.

In accordance with the invention, therefore, and referring to FIG. 3, the transmit link may appear as illustrated in the figure, wherein it is assumed that client 1 is the most important client and its hardware port can transmit up to 16 frames per transmit "ownership". The receipt of fibre channel frames is bound by the number of frames sent by the transmitting port. (As noted above, each square in FIGS. 2 and 3 represents a frame of data, and the number within the square identifies the client.) Clients 2, 3, and 4, however, are of equal but lower priority and they transmit up to 8 frames before giving up ownership. In the illustrated embodiment of FIG. 3, it is assumed that the client ports have infinite credit. However, in the event that they do not, the transmission of frames may terminate prior to the end of the allowed 16 or 8 frames if there is no credit as illustrated in FIG. 3A, and the next sequence will begin or continue its transmission. In FIG. 3A, the last transmission of client 4 frames is terminated prematurely at 33 for lack of credit, and the transmission of frames from client 1 then begins.

Thus, link bandwidth is better utilized since lack of credit will not stall the link. In addition, those sources with higher priority will be received in less time than if the interleaving were performed as if all priorities were equal, not taking into account credit blackouts, and the interleaving was performed strictly on a sequence boundary. The illustrated embodiment of the invention also increases performance since a subsystem will not be throttled by its slowest client. The priorities and operation of the system, in effect, provide an averaging process in which the higher priority clients have a higher average throughput and greater channel bandwidth.

The illustrated embodiment, by assigning priority to specific data streams, also affords a smaller granularity of data interleaving. This can vary in accordance with the particular embodiment of the invention and the lack of stalling due to lack of data may be further avoided by reducing the frames which particular ports can transmit or receive, in effect, lowering their bandwidth to accommodate the nature of the credit afforded to them.

Modifications of the disclosed embodiment of the invention will be apparent to those practiced within the field, and are within the scope of the following claims.

What is claimed is:

1. A data communications system comprising a channel switch, a plurality of client information sources connected over data communications channels to said channel switch for transmitting frames of data, at least one peripheral device connected by a data channel to said channel switch, said channel switch combining information from said information sources according to a frame protocol, said protocol defining a predetermined method for selecting which pending information source data to deliver to said peripheral device, and for limiting the connection line capacity of each source to a non-zero selected number of frames of data based upon connection criteria parameters that can vary from information source to information source.

2. A fibre channel communications system comprising a fibre channel switch, a plurality of client information sources connected to said fibre channel switch for transmitting frames of data, at least one mass storage device connected by a data channel to said fibre switch, said fibre channel switch combining information from said information sources according to a frame protocol, said protocol defining a predetermined method for selecting which information source data to deliver to said storage device, and for limiting the connection line capacity of each source to a non-zero selected number of frames of data, at least some sequences of frames on the data channel containing a number of data frames less than the number of frames forming a natural sequence boundary at the client information source.

3. The apparatus of claim 2 wherein said fibre channel switch limits the selected number of frames to each source depending upon a priority value assigned to the source and the credit available to the source.

4. The apparatus of claim 3 further comprising means for determining the current credit available to each information source.

5. The apparatus of claim 3 further comprising means for providing priority average weighing to each information source according to said assigned priority value.

6. A method of communicating frames of data through a channel switch between a plurality of client information sources having pending data and a peripheral device comprising the steps of determining the credit available to each of the information sources, determining a priority value, expressed as a non-zero number of frames, dedicated to each of the information sources, and communicating with said connected client information sources in a round robin protocol taking into account the credit and priority value associated with each information source.

7. A method of communicating frames of data through a fibre channel switch between a plurality of client information sources and a storage system having at least one mass storage device comprising the steps of determining the credit available to each of the information sources, determining a priority value, expressed as a non-zero number of frames, dedicated to each of the information sources, and communicating with said connected client information sources in a round robin protocol taking into account the credit and priority value associated with each information source, at least some sequences of frames on the data channel containing a number of data frames less than the number of data frames forming a natural sequence boundary at the client information source.

8. The method of claim 7 further comprising the steps of:

limiting each transmission of data for a client source to a number of frames which is the lessor of an amount determined by each of the frame priority value and an amount determined by the source credit.

9. The method of claim 8 further wherein said frames of data are organized into sequences of frames and said credit represents a buffer capacity available along said transmission path.

10. The method of claim 7 further comprising the steps of effecting bandwidth priority averaging by associating said priority value to each different client information source.

* * * * *